US012098442B2

United States Patent
Ruan et al.

(10) Patent No.: US 12,098,442 B2
(45) Date of Patent: Sep. 24, 2024

(54) METHOD FOR ENRICHING LITHIUM FROM LITHIUM CLAY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Dingshan Ruan, Guangdong (CN); Peng Zhang, Guangdong (CN); Changdong Li, Guangdong (CN); Shijian Tang, Guangdong (CN); Yuntao Liu, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/029,656

(22) PCT Filed: Sep. 22, 2022

(86) PCT No.: PCT/CN2022/120623
§ 371 (c)(1),
(2) Date: Feb. 8, 2024

(87) PCT Pub. No.: WO2024/036697
PCT Pub. Date: Feb. 22, 2024

(65) Prior Publication Data
US 2024/0200164 A1     Jun. 20, 2024

(30) Foreign Application Priority Data
Aug. 17, 2022   (CN) ......................... 202210984273.9

(51) Int. Cl.
C22B 26/12    (2006.01)
B03D 1/018    (2006.01)
(Continued)

(52) U.S. Cl.
CPC .............. C22B 26/12 (2013.01); B03D 1/018 (2013.01); B03D 1/02 (2013.01); C22B 3/12 (2013.01)

(58) Field of Classification Search
CPC ........... C22B 26/12; C22B 3/12; C03D 1/018; B03D 1/02
(Continued)

(56) References Cited

U.S. PATENT DOCUMENTS 4,098,687 A    7/1978   Yang
6,138,835 A    10/2000  Jessup et al.

FOREIGN PATENT DOCUMENTS

CN    103240185 A    8/2013
CN    107008567 A    8/2017
(Continued)

OTHER PUBLICATIONS

International Search Report and Written Opinion of the International Searching Authority issued by the China National Intellectual Property Administration for International Patent Application No. PCT/CN2022/120623, mailed on Dec. 21, 2022, with an English translation.

*Primary Examiner* — Melissa S Swain
(74) *Attorney, Agent, or Firm* — MYERS WOLIN, LLC

(57) ABSTRACT

A method for enriching lithium from a lithium clay includes the following steps (1) the raw ore were crushed to produce fine particles, (2) performing rougher on the fine particles by adding ferric sulfate or ferric nitrate, sodium oleate, and cocoamine to obtain rough concentrate and rough tailing, (3) finely separating the rough concentrate to obtain the first part (Continued)

of concentrate, (4) re-grinding the rough tailing by ball mill, (5) performing rougher on the reground tailing to obtain reground rough concentrate and re-ground rough tailing, (6) performing cleaner on the reground rough concentrate to obtain the second part of concentrate, and (7) performing scavenger on the reground rough tailing to obtain the cleaned tailing.

10 Claims, 1 Drawing Sheet

(51) Int. Cl.
  *B03D 1/02* (2006.01)
  *C22B 3/12* (2006.01)

(58) Field of Classification Search
  USPC ..................................................... 423/179.5
  See application file for complete search history.

(56) References Cited

FOREIGN PATENT DOCUMENTS

| | | |
|---|---|---|
| CN | 111298978 A | 6/2020 |
| CN | 111893318 A | 11/2020 |
| CN | 114887757 A | 8/2022 |

METHOD FOR ENRICHING LITHIUM FROM LITHIUM CLAY

CROSS-REFERENCE TO RELATED APPLICATIONS

This application is a National Stage under 35 U.S.C. § 371 of International Application Number PCT/CN2022/120623, filed on Sep. 22, 2022, and which designated the U.S., which claims priority to Chinese Patent Application No. 202210984273.9, filed on Aug. 17, 2022. The contents of each are incorporated herein by reference in their entirety.

TECHNICAL FIELD

The present disclosure relates to the technical field of resources comprehensive utilization, and more particularly, to a method for enriching lithium from a lithium clay.

BACKGROUND

Lithium is an important energy metal and used in high-energy lithium batteries and controlled thermonuclear reactions, and becomes an important raw material for solving a long-term energy supply of human beings. The lithium series products are widely used in the industries of smelting, refrigeration, atomic energy, aerospace, ceramics, glass, lubricating grease, rubber, welding, medicine, batteries etc. Lithium has special physical and electrochemical properties such as low density and high specific energy. With the rapid development of new energy industries, the TWh era is gradually developed. But the supply of lithium resources worldwide is a serious problem. Therefore, lithium price is continuously increased. The competition of the new energy industry is gradually changing into the competition of lithium resources. The lithium ore is of rich resources, but lower grade, fine embedded particles, easy argillization, and a low utilization level. Besides, the saline lake lithium resources is located in plateau areas and is of high magnesium-lithium ratio, and thus has difficulty in development. Since the demand of lithium resources continuously increases and the development and utilization technology of the lithium ore is restricted, the lithium resources in China are seriously insufficient and have an extremely high dependency on the outside. At present, the lithium deposit exploited and utilized all over the world is mainly in the deposit of saline lake lithium and pegmatite deposit. In recent years, batches of clay-type lithium ores were discovered in China. If the type ores can be developed and utilized efficiently, the shortage of the lithium resources can be relieved effectively. The current lithium resources consist of:
(1) Hard rock-type ore: the ore is represented by spodumene and lepidolite, but the high-quality resources are almost completely shared and consumed at present,
(2) saline lake lithium: since the salt lakes in China are located in plateau areas, the magnesium-lithium ratio is high, the infrastructure is extremely poor, and the project period is long. Therefore, the large-scale industrial production of the lithium extracted from the salt lakes cannot be realized so far.
(3) Sedimentary ore: this type is mainly the lithium clay, it's of large stock, enough good grade. But there is no industrialization precedent. So the development of the type resources has technical barrier.

Currently, the technology for extracting lithium from the lithium ore mainly comprises limestone roasting method, sulfuric acid method, limestone method and soda ash method etc. The process for extracting lithium has problems of high energy consumption, high requirement on equipment, large slag yield and non-environmental friendliness etc. Therefore, a beneficiation method is developed aiming at the current situation of a lithium clay in China. A pre-enrichment is realized while a high recovery of lithium is ensured, part of gangues is discarded, so the feed material into the metallurgy process, the consumed reagents and the energy consumption will be reduced.

Since lithium in the lithium clay is mainly present as the cookeite. The Li grade in chlorite is relative low, and there's no examples in the research and development of beneficiation. Therefore, the method for enriching the lithium clay and discarding tailings by beneficiation method is urgent to be further researched and explored.

SUMMARY

The present disclosure aims to overcome the shortcomings of the prior art and provides a method for enriching lithium from a lithium clay. The method is of simple process, low energy consumption and high recovery.

To achieve the above objective, the technical solution adopted by the present disclosure is:

A method for enriching lithium from a lithium clay, comprising the following steps:
(1) crushing the lithium clay to produce the −1 mm size fraction, wherein the mass proportion of the −0.15 mm is ≥60%;
(2) flotating the −1 mm, adding an aqueous solution of ferric sulfate or ferric nitrate, and stirring evenly, then adding regulator to adjust pulp pH value between 9-10, then adding an aqueous solution of sodium oleate and an aqueous solution of cocoamine, stirring evenly, and then flotation to obtain a rough concentrate and a rough tailing;
(3) flotating the rough concentrate, and adding a pH regulator to adjust a pH value of the system to be 9-10, and stirring evenly, then adding an aqueous solution of sodium oleate and an aqueous solution of cocoamine, stirring evenly, and then flotation to obtain a concentrate A and a cleaned tailing;
(4) mixing the rough tailing in step (2) with the cleaned tailing in step (3) and performing a wet ball milling to obtain a tailing A with a mass ratio of a −0.074 mm tailing ≥80%;
(5) flotating the tailing A, adding an aqueous solution of ferric sulfate or ferric nitrate, stirring evenly, adding a pH regulator to adjust a pH value to be 9-10, then adding an aqueous solution of sodium hexametaphosphate, stirring evenly, adding an aqueous solution of sodium oleate and an aqueous solution of cocoamine, stirring evenly, and then flotation to obtain a reground rough concentrate and a reground rough tailing;
(6) flotating the reground rough concentrate, adding a pH regulator to adjust a pH value to be 9-10, then adding an aqueous solution of sodium hexametaphosphate, stirring evenly, adding an aqueous solution of sodium oleate and an aqueous solution of cocoamine, stirring evenly, and then flotation to obtain a concentrate B;
(7) flotating the reground rough tailing, adding a pH regulator to adjust a pH value to be 9-10, then adding an aqueous solution of sodium oleate and an aqueous solution of cocoamine, stirring evenly, and then flotation to obtain a cleaned tailing B; and (8) using the concentrate A and the concentrate B as a final concentrate, and using the cleaned tailing B as a final tailing.

Since the raw lithium clay has a low grade, lithium is mainly present as cookeite. Gangue minerals mainly comprise the silicate and the calcium salt. The minerals are easy for argillization in grinding process. Therefore, the beneficiation method, preliminary enrichment and separation have certain difficulty. The rough particle rapid flotation and the tailing re-milling and re-separating are performed. Besides, an anion and cation mixed collector and an activator are used in the beneficiation test on the lithium clay, which overcomes the problem that the minerals are easy for argillization and difficult to separate. In addition, the present disclosure selects ferric sulfate or ferric nitrate as the activator and sodium hexametaphosphate as the inhibitor, so the flotation efficiency is improved and the grade of lithium in the concentrate is higher.

Preferably, in step (2), based on a mass of the −1 mm raw ore, the dosage of the ferric sulfate or the ferric nitrate is 300-500 g/t, the dosage of the sodium oleate is 500-700 g/t, and the dosage of the cocoamine is 150-300 g/t.

The experiments of the present disclosure show that the ferric sulfate or the ferric nitrate, the sodium oleate, and the cocoamine have an extremely strong promotion effect, and have a stronger enrichment effect on lithium compared with other activators and collectors.

Preferably, the pH regulator is at least one of sodium hydroxide or sodium carbonate.

Preferably, in step (3), based on a mass of the −1 mm raw ore, for the feed, the dosage of the sodium oleate is 200-300 g/t and the dosage of the cocoamine is 80-150 g/t. In step (5), based on a mass of the −1 mm raw ore, for the feed, the dosage of the ferric sulfate or the ferric nitrate is 150-250 g/t, the dosage of the sodium hexametaphosphate is 400-600 g/t, the dosage of the sodium oleate is 300-400 g/t, and the dosage of the cocoamine is 80-150 g/t. In step (6), based on a mass of the −1 mm raw ore, for the feed, the dosage of the sodium hexametaphosphate is 150-250 g/t, the dosage of the sodium oleate is 150-200 g/t, and the dosage of the cocoamine is 30-70 g/t. In step (7), based on a mass of the −1 mm raw ore, for the feed, the dosage of the sodium oleate is 150-200 g/t and the dosage of the cocoamine is 40-90 g/t.

Further preferably, in steps (2), (3), (5), (6) and (7), a mass ratio of the sodium oleate to the cocoamine is (2.8-3.4):1. Further preferably, a mass ratio of the sodium oleate to the cocoamine is 3:1. The experiments of the present disclosure show that when the mass ratio of the sodium oleate to the cocoamine meets the above limit, an effect of enriching lithium from the lithium clay is obviously better. The grade of $Li_2O$ in the concentrate can reach 1.5% or more, recovery can reach 75% or more, and an enrichment ratio can reach 2.3 or more.

Preferably, a mass fraction of ferric sulfate or ferric nitrate in the aqueous solution of ferric sulfate or ferric nitrate is 1%-3%, a mass fraction of sodium hexametaphosphate in the aqueous solution of sodium hexametaphosphate is 1%-3%, a mass fraction of sodium oleate in the aqueous solution of sodium oleate is 1%-3%, and a mass fraction of cocoamine in the aqueous solution of cocoamine is 0.5%-1.5%.

Further preferably, the activator is ferric sulfate.

Compared with the existing technology, the present disclosure has the following beneficial effects:

The present disclosure firstly flotates a rough particle and has higher efficiency; then a primary rough separation is performed by taking ferric sulfate or ferric nitrate as the activator and cocoamine and sodium oleate as collectors to obtain a rough concentrate and a rough tailing; the rough concentrate is flotated to obtain a concentrate and a cleaned tailing; and then the tailing is ball-milled, carrying out flotation on the tailings by taking ferric sulfate or ferric nitrate as an activator, sodium hexametaphosphate as an inhibitor, and sodium oleate as a collector to obtain a reground rough concentrate and a reground rough tailing, and the reground rough concentrate is flotated to obtain a concentrate. The concentrate obtained by the method of the present disclosure has a high grade of $Li_2O$ and a high recovery.

BRIEF DESCRIPTION OF THE DRAWINGS

FIG. 1 is a process flow diagram of the method for enriching lithium from a lithium clay of embodiment 1.

DETAILED DESCRIPTION

To better explain the objective, technical solutions, and advantages of the present disclosure, the present disclosure will be further explained below accompanying with the drawings and embodiments.

Embodiment 1

An embodiment of the method for enriching lithium from a lithium clay of the present disclosure was provided. The process flow diagram of the method of the present embodiment is shown in FIG. 1. The method specifically comprised the following steps:

(1) the lithium clay was successively added into a jaw crusher and a roller crusher to be crushed to obtain the −1 mm size fraction, wherein the mass proportion of the −0.15 mm was ≥60%;

(2) the aqueous solution of sodium carbonate with a mass fraction of sodium carbonate of 5%, the aqueous solution of ferric sulfate with a mass fraction of ferric sulfate of 2%, the aqueous solution of sodium hexametaphosphate with a mass fraction of sodium hexametaphosphate of 2%, the aqueous solution of sodium oleate with a mass fraction of sodium oleate of 2%, and the aqueous solution of cocoamine with a mass fraction of cocoamine of 1% (the aqueous solution of cocoamine contains an acetic acid with a mass fraction of 0.5%) were prepared;

(3) the −1 mm in step (1) was sent into a flotator and stirred for two minutes; and then the aqueous solution of ferric sulfate was added, the materials were stirred for two minutes, the aqueous solution of sodium carbonate was used to adjust a pH value to be 10, the materials were stirred for two minutes, then the aqueous solution of sodium oleate and the aqueous solution of cocoamine were added, the materials were stirred for three minutes, and forth flotation for three minutes to obtain a rough concentrate and a rough tailing, wherein based on a mass of the −1 mm raw ore, the dosage of the ferric sulfate was 400 g/t, the dosage of the sodium oleate was 600 g/t, and the dosage of the cocoamine was 200 g/t;

(4) the rough concentrate was sent into the flotator and stirred for two minutes, the aqueous solution of sodium carbonate was used to adjust a pH value to be 10, the materials were stirred for two minutes, then the aqueous solution of sodium oleate and the aqueous solution of cocoamine were added, the materials were stirred for three minutes, and Then flotation for three minutes to obtain a concentrate A and a cleaned tailing, wherein for the feed, the dosage of the sodium oleate is 300 g/t, and the dosage of the cocoamine is 100 g/t;

(5) the rough tailing in step (3) was mixed with the cleaned tailing in step (4) and the mixture was subjected to a wet ball milling to obtain a tailing A with a mass ratio of a −0.074 mm tailing ≥80%;

(6) the tailing A in step (5) was sent into the flotator and stirred for two minutes, then the aqueous solution of ferric sulfate was added, the materials were stirred for two minutes, the aqueous solution of sodium carbonate was used to adjust a pH value to be 10, the materials were stirred for two minutes, subsequently the aqueous solution of sodium hexametaphosphate was added, the materials were stirred for two minutes, then the aqueous solution of sodium oleate and the aqueous solution of cocoamine were added, the materials were stirred for three minutes, and flotation for five minutes to obtain a reground rough concentrate and a reground rough tailing, wherein for the feed, the dosage of the ferric sulfate was 250 g/t, the dosage of the sodium hexametaphosphate was 500 g/t, the dosage of the sodium oleate was 300 g/t, and the dosage of the cocoamine was 100 g/t;

(7) the reground rough concentrate was sent into the flotator and stirred for two minutes, the aqueous solution of sodium carbonate was used to adjust a pH value to be 10, the materials were stirred for two minutes, then the aqueous solution of sodium hexametaphosphate was added, the materials were stirred for two minutes, then the aqueous solution of sodium oleate and the aqueous solution of cocoamine were added, the materials were stirred for three minutes, forth flotation for three minutes to obtain a concentrate B, and the product in a groove of the flotator was returned to be reground and roughly separated, wherein for the feed, the dosage of the sodium hexametaphosphate was 200 g/t, the dosage of the sodium oleate was 150 g/t, and the dosage of the cocoamine was 50 g/t;

(8) the reground rough tailing was sent into the flotator and stirred for two minutes, the aqueous solution of sodium carbonate was used to adjust a pH value to be 10, the materials were stirred for two minutes, then the aqueous solution of sodium oleate and the aqueous solution of cocoamine were added, the materials were stirred for three minutes, after the even stirring, flotation for three minutes to obtain a cleaned tailing B, and the separated froth product was returned to be reground and roughly separated, wherein for the feed, the dosage of the sodium oleate was 200 g/t and the dosage of the cocoamine was 60 g/t;

(9) the concentrate A and the concentrate B were used as a final concentrate, and the cleaned tailing B was used as a final tailing.

Embodiment 2

An embodiment of the method for enriching lithium from a lithium clay of the present disclosure was provided. Differences between the method of the present embodiment and embodiment 1 are that in step (3), based on a mass of the −1 mm raw ore, the dosage of the ferric sulfate was 300 g/t, the dosage of the sodium oleate was 700 g/t, and the dosage of the cocoamine was 230 g/t; in step (4), for the feed, the dosage of the sodium oleate was 240 g/t and the dosage of the cocoamine was 80 g/t; in step (6), for the feed, the dosage of the ferric sulfate was 150 g/t, the dosage of the sodium hexametaphosphate was 600 g/t, the dosage of the sodium oleate was 400 g/t, and the dosage of the cocoamine was 130 g/t; in step (7), for the feed, the dosage of the sodium hexametaphosphate was 250 g/t, the dosage of the sodium oleate was 200 g/t, and the dosage of the cocoamine was 66 g/t; and in step (8), for the feed, the dosage of the sodium oleate was 150 g/t and the dosage of the cocoamine was 50 g/t.

Embodiment 3

An embodiment of the method for enriching lithium from a lithium clay of the present disclosure was provided. Differences between the method of the present embodiment and embodiment 1 are that in step (3), based on a mass of the −1 mm raw ore, the dosage of the ferric sulfate was 500 g/t, the dosage of the sodium oleate was 500 g/t, and the dosage of the cocoamine was 170 g/t; in step (4), for the feed, the dosage of the sodium oleate was 250 g/t and the dosage of the cocoamine was 85 g/t; in step (6), for the feed, the dosage of the ferric sulfate was 200 g/t, the dosage of the sodium hexametaphosphate was 400 g/t, the dosage of the sodium oleate was 360 g/t, and the dosage of the cocoamine was 120 g/t; in step (7), for the feed, the dosage of the sodium hexametaphosphate was 150 g/t, the dosage of the sodium oleate was 200 g/t, and the dosage of the cocoamine was 70 g/t; and in step (8), for the feed, the dosage of the sodium oleate was 180 g/t and the dosage of the cocoamine was 60 g/t.

Embodiment 4

An embodiment of the method for enriching lithium from a lithium clay of the present disclosure was provided. Differences between the method of the present embodiment and embodiment 1 are that in step (3), for the feed, the dosage of the sodium oleate was 640 g/t and the dosage of the cocoamine was 160 g/t.

Embodiment 5

An embodiment of the method for enriching lithium from a lithium clay of the present disclosure was provided. The difference between the method of the present embodiment and embodiment 1 was only that ferric nitrate was used instead of ferric sulfate.

Comparative Example 1

A method for enriching lithium from a lithium clay was provided. The differences between the method and embodiment 1 were only that sodium hexametaphosphate was not added in steps (6) and (7).

Comparative Example 2

A method for enriching lithium from a lithium clay was provided. The differences between the method and embodiment 1 were only that ferric sulfate was not added in steps (3) and (6).

Comparative Example 3

A method for enriching lithium from a lithium clay was provided. The differences between the method and embodiment 1 were that ferric sulfate was not added in steps (3) and (6), sodium oleate was not added in steps (3), (4), (6), (7) and (8); in step (3), the dosage of cocoamine was 300 g/t; in step (4), the dosage of cocoamine was 150 g/t; in step (6), the dosage of cocoamine was 150 g/t; in step (7), the dosage of cocoamine was 60 g/t; and in step (8), the dosage of cocoamine was 80 g/t.

Comparative Example 4

A method for enriching lithium from a lithium clay was provided. The difference between the method and embodiment 1 was only that copper sulfate was used instead of ferric sulfate.

Comparative Example 5

A method for enriching lithium from a lithium clay was provided. The difference between the method and embodiment 1 was only that lauryl amine was used instead of cocoamine.

Table 1 shows data of effect verification of the methods in the embodiments and the comparative examples. The grade of $Li_2O$ in the raw ore used in the embodiments and the comparative examples is 0.60%-0.70%. In the following table, the grade refers to the content of $Li_2O$, the yield is a ratio of product mass to raw ore mass, and the recovery is a ratio of a product of the product yield and grade to a product of the raw ore yield (100%) and grade.

It can be seen from Table 1 that the grade of $Li_2O$ in the final concentrates recovered in embodiments 1-5 can all reach 1.4% or more and the recovery can all reach 69.5% or more, indicating the method can effectively enrich lithium in a lithium clay. No inhibitor was added in comparative example 1 and no activator was added in comparative example 2, such that the grade of $Li_2O$ in the product is low; no activator was added in comparative example 3 and the amount of a collector is obviously too low, thus the grade of $Li_2O$ is only 1.09%; copper sulfate is used as an activator in comparative example 4, and will greatly affect a recovery of the product, which is significantly lower than that in the embodiment; and in comparative example 5, lauryl amine is used as a collector instead of cocoamine, and will also greatly affect the grade of $Li_2O$ in the product, which is less than 1.3%.

In addition, comparing the test results of embodiments 1-3 and embodiment 4, it can be found that when a mass ratio of sodium oleate to cocoamine is (2.8-3.4):1 during the processing process, the recovery is significantly higher and the grade of $Li_2O$ in the product is also higher. Comparing the test results of embodiment 1 and embodiment 5, it can be found that compared with ferric nitrate, ferric sulfate as an activator has obviously better effects on recovering and enriching lithium.

Finally, it should be noted that the foregoing embodiments are only intended to describe the technical solutions, rather than to limit the protection scope of the present disclosure.

TABLE 1

| Item | Concentrate A (%) | | | Concentrate B (%) | | | Final concentrate | | | | Final tailing (%) | | |
|---|---|---|---|---|---|---|---|---|---|---|---|---|---|
| | Grade | Yield | Recovery | Grade | Yield | Recovery | Grade % | Yield % | Recovery % | Enrichment ratio | Grade | Yield | Recovery |
| Embodiment 1 | 1.68 | 23.39 | 58.43 | 1.33 | 10.23 | 20.31 | 1.57 | 33.62 | 78.74 | 2.34 | 0.22 | 66.38 | 21.26 |
| Embodiment 2 | 1.53 | 25.88 | 58.63 | 1.18 | 11.05 | 19.39 | 1.43 | 36.93 | 78.02 | 2.13 | 0.24 | 62.61 | 21.98 |
| Embodiment 3 | 1.66 | 22.43 | 55.12 | 1.23 | 9.04 | 16.45 | 1.53 | 31.47 | 71.57 | 2.30 | 0.28 | 68.53 | 28.43 |
| Embodiment 4 | 1.53 | 21.38 | 50.13 | 1.31 | 9.63 | 19.40 | 1.46 | 31.01 | 69.52 | 2.26 | 0.28 | 70.99 | 30.48 |
| Embodiment 5 | 1.57 | 22.58 | 53.00 | 1.25 | 9.85 | 18.37 | 1.46 | 32.43 | 71.38 | 2.19 | 0.28 | 67.57 | 28.62 |
| Comparative example 1 | 1.64 | 23.25 | 56.65 | 0.60 | 15.47 | 13.89 | 1.22 | 38.72 | 70.53 | 1.83 | 0.32 | 61.28 | 29.47 |
| Comparative example 2 | 1.40 | 21.58 | 45.14 | 0.90 | 9.35 | 12.64 | 1.25 | 30.93 | 57.77 | 1.93 | 0.41 | 69.07 | 42.23 |
| Comparative example 3 | 1.25 | 26.34 | 47.54 | 0.77 | 13.28 | 14.88 | 1.09 | 39.62 | 62.42 | 1.58 | 0.43 | 60.38 | 37.58 |
| Comparative example 4 | 1.46 | 21.26 | 46.48 | 1.21 | 9.55 | 17.20 | 1.38 | 30.81 | 63.67 | 2.06 | 0.35 | 69.19 | 36.33 |
| Comparative example 5 | 1.38 | 22.34 | 47.49 | 1.12 | 11.25 | 19.43 | 1.29 | 33.59 | 66.92 | 2.00 | 0.32 | 66.41 | 33.08 |

Although the present disclosure is described in detail with reference to the preferred embodiments, a person of ordinary skill in the art should understand that modifications or equivalent replacements may be made to the technical solutions of the present disclosure without departing from the essence and scope of the technical solutions of the present disclosure.

The invention claimed is:

1. A method for enriching lithium from a lithium clay, comprising the following steps:
   (1) crushing the lithium clay to produce the −1 mm size fraction, wherein the mass proportion of the −0.15 mm is ≥60%;
   (2) flotating the −1 mm, adding an aqueous solution of ferric sulfate or ferric nitrate, and stirring evenly, then adding regulator to adjust pulp pH value between 9-10, then adding an aqueous solution of sodium oleate and an aqueous solution of cocoamine, stirring evenly, and then flotation to obtain a rough concentrate and a rough tailing;
   (3) flotating the rough concentrate, and adding a pH regulator to adjust a pH value of the system to be 9-10, and stirring evenly, then adding an aqueous solution of sodium oleate and an aqueous solution of cocoamine, stirring evenly, and then flotation to obtain a concentrate A and a cleaned tailing;
   (4) mixing the rough tailing in step (2) with the cleaned tailing in step (3) and performing a wet ball milling to obtain a tailing A with a mass ratio of a −0.074 mm tailing ≥80%;
   (5) flotating the tailing A, adding an aqueous solution of ferric sulfate or ferric nitrate, stirring evenly, adding a pH regulator to adjust a pH value to be 9-10, then adding an aqueous solution of sodium hexametaphosphate, stirring evenly, adding an aqueous solution of sodium oleate and an aqueous solution of cocoamine, stirring evenly, and then flotation to obtain a reground rough concentrate and a reground rough tailing;
   (6) flotating the reground rough concentrate, adding a pH regulator to adjust a pH value to be 9-10, then adding an aqueous solution of sodium hexametaphosphate, stirring evenly, adding an aqueous solution of sodium oleate and an aqueous solution of cocoamine, stirring evenly, and then flotation to obtain a concentrate B;
   (7) flotating the reground rough tailing, adding a pH regulator to adjust a pH value to be 9-10, then adding an aqueous solution of sodium oleate and an aqueous solution of cocoamine, stirring evenly, and then flotation to obtain a cleaned tailing B; and
   (8) using the concentrate A and the concentrate B as a final concentrate, and using the cleaned tailing B as a final tailing.

2. The method of claim 1, wherein in step (2), based on a mass of the −1 mm raw ore, the dosage of the ferric sulfate or the ferric nitrate is 300-500 g/t, the dosage of the sodium oleate is 500-700 g/t, and the dosage of the cocoamine is 150-300 g/t.

3. The method of claim 1, wherein the pH regulator is at least one of sodium hydroxide or sodium carbonate.

4. The method of claim 1, wherein in step (3), based on a mass of the −1 mm raw ore, the dosage of the sodium oleate is 200-300 g/t and the dosage of the cocoamine is 80-150 g/t.

5. The method of claim 1, wherein in step (5), based on a mass of the −1 mm raw ore, the dosage of the ferric sulfate or the ferric nitrate is 150-250 g/t, the dosage of the sodium hexametaphosphate is 400-600 g/t, the dosage of the sodium oleate is 300-400 g/t, and the dosage of the cocoamine is 80-150 g/t.

6. The method of claim 1, wherein in step (6), based on a mass of the −1 mm raw ore, the dosage of the sodium hexametaphosphate is 150-250 g/t, the dosage of the sodium oleate is 150-200 g/t, and the dosage of the cocoamine is 30-70 g/t.

7. The method of claim 1, wherein in step (7), based on a mass of the −1 mm raw ore, the dosage of the sodium oleate is 150-200 g/t and the dosage of the cocoamine is 40-90 g/t.

8. The method of claim 1, wherein in steps (2), (3), (5), (6) and (7), a mass ratio of the sodium oleate to the cocoamine is (2.8-3.4):1.

9. The method of claim 8, wherein in steps (2), (3), (5), (6) and (7), a mass ratio of the sodium oleate to the cocoamine is 3:1.

10. The method of claim 1, wherein a mass fraction of ferric sulfate or ferric nitrate in the aqueous solution of ferric sulfate or ferric nitrate is 1%-3%, a mass fraction of sodium hexametaphosphate in the aqueous solution of sodium hexametaphosphate is 1%-3%, a mass fraction of sodium oleate in the aqueous solution of sodium oleate is 1%-3%, and a mass fraction of cocoamine in the aqueous solution of cocoamine is 0.5%-1.5%.

* * * * *